United States Patent
Cornfield (10) Patent No.: US 6,360,654 B1
(45) Date of Patent: Mar. 26, 2002

(54) MULTI-PURPOSE COOKWARE

(76) Inventor: Randall Cornfield, 7431 Kingsley # 501, Côte St-Luc, Québec (CA), H4W 1P1

( * ) Notice: Subject to any disclaimer, the term of this patent is extended or adjusted under 35 U.S.C. 154(b) by 0 days.

(21) Appl. No.: 09/785,373

(22) Filed: Feb. 16, 2001

(51) Int. Cl.[7] .......................... A47J 27/00; A47J 37/00; A47J 37/10
(52) U.S. Cl. .......................... 99/339; 99/340; 99/422; 99/450; 99/448; 220/912
(58) Field of Search .......................... 99/339, 340, 401, 99/422–425, 444–450, 482; 126/373.1, 390.1, 385.1; 220/912; D7/354, 357; 426/523

(56) References Cited

U.S. PATENT DOCUMENTS

| | | | | |
|---|---|---|---|---|
| 1,072,892 A | * | 9/1913 | Wilson | 99/422 |
| 2,622,591 A | | 12/1952 | Bramberry | 126/381 |
| D173,387 S | | 4/1954 | Schnitzer | D44/15 |
| 2,674,536 A | * | 4/1954 | Fisher | 99/448 |
| 3,439,603 A | | 4/1969 | Reames | 99/355 |
| 3,719,507 A | * | 3/1973 | Barden | 99/448 |
| 3,808,963 A | | 5/1974 | Ludena | 99/417 |
| 4,418,829 A | | 12/1983 | Clay | 220/74 |
| 4,491,235 A | | 1/1985 | Fournier et al. | 220/94 |
| 4,528,975 A | | 7/1985 | Wang | 126/369 |
| 4,574,277 A | * | 3/1986 | Bohl | 99/339 X |
| 4,666,727 A | | 5/1987 | Wang | 426/523 |
| 4,873,921 A | | 10/1989 | Piane, Sr. | 99/422 |
| 5,129,314 A | | 7/1992 | Hu | 99/422 |
| 5,189,945 A | | 3/1993 | Hennick | 99/339 |
| 5,239,916 A | | 8/1993 | Hu | 99/422 |
| 5,241,900 A | | 9/1993 | Piane, Sr. | 99/422 |
| 5,345,062 A | | 9/1994 | Maudal | 219/432 |
| 5,365,833 A | | 11/1994 | Chen | 99/447 |
| 5,385,085 A | | 1/1995 | Piane, Sr. | 99/422 |
| 5,511,466 A | | 4/1996 | Dzibinski | 99/339 |

* cited by examiner

Primary Examiner—Timothy F. Simone
(74) Attorney, Agent, or Firm—Schweitzer Cornman Gross & Bondell LLP (57) ABSTRACT

A cooker having a base unit and a cover. The cover including a top and bottom ends. The bottom end having a circular edge extending straight and upwardly therefrom to form an annular wall. The annular wall further extending inwardly to form a top portion.

11 Claims, 4 Drawing Sheets

MULTI-PURPOSE COOKWARE

FIELD OF THE INVENTION

The present invention is concerned with a cooker of the type having a cooking base and a cover.

BACKGROUND OF THE INVENTION

Several different types of cookers presently exist on the market. Each of these cookers is adapted for a specific use and cooking process. To this day, different cookers are provided for different cooking processes. For example and just to name a few, woks are designed to stir-fry foods together, pressure cookers cook food under high temperature and steam pressure and frying pans are designed to fry food.

For most of these cookers, the essential component allowing effective cooking of foods is provided by the cooking vessel or the base unit. Therefore, the covers for most of these cookers act only as a secondary component, or an accessory that is not essential for the cooking process.

Furthermore, in most cases, a substantially amount of oil is needed for cooking the food. If not enough oil is used, the food, especially meat, will become very dry and tough. If too much oil is used, the food will be very oily and unhealthy to eat.

U.S. Pat. No. 5,511,466 is concerned with a cooker that has an annular trough on the periphery of the cooking vessel to allow separate cooking or treatment of foodstuff.

U.S. Pat. No. 5,287,798 is concerned with a high temperature dry steam cooker. According to this patent, foods are cooked with high temperatures steam created within the confinement of the cooker. In use, water is placed in the base unit and food is placed on a rack that sits above the base unit containing water. During cooking, a tray and a steam baffle is installed over the rack containing food and the cover is then installed thereon thereby creating the cooking confinement.

In view of the above, there is a need to design a cooker that is simple in structure, multifunctional and allows a healthy way of cooking foods.

SUMMARY OF THE INVENTION

A first object of the present Invention is to provide a cooker that is multifunctional in that it can carry out different cooking processes such as all forms of stove-cooking without limiting to frying, steaming, poaching, boiling, stir-frying, and saute, as well as other oven-like cooking processes not limiting to baking and roasting on the stove top.

A second object of the invention is to provide a cooker that is simple in structure and easy to use.

A third object of the present invention is to provide a cooker that allows a faster way of cooking food.

A fourth object of the present invention is to provide a cooker that allows a healthier way of cooking food.

A fifth object of the present invention is to provide a cooker that will retain the moisture and vitamins of the food.

Accordingly, the objects of the present invention are met with a cooker comprising a cooking vessel and a cover, the cooking vessel comprising an open receptacle having a bottom surface which extends upwardly and unitarily to terminate at a circular rim, the rim having a diameter and an end extending upwardly thereby forming an annular collar, the annular collar having a diameter larger than the diameter of the rim;

a cover having a top and a bottom end, the bottom end having a circular edge adapted to sit on the rim of the cooking vessel, the circular edge having a diameter smaller than the diameter of the annular collar, the cover extending straight and upwardly from the circular edge to form an annular wall of a predetermined height, the annular wall extending inwardly to form a top end, the top end including a handle.

The objects and advantages and other features of the present invention will become more apparent upon reading of the following non-restrictive description of a preferred embodiment thereof, given for the purpose of exemplification only, with reference to the accompanying drawings.

DETAILED DESCRIPTION OF THE INVENTION

Figure 1:
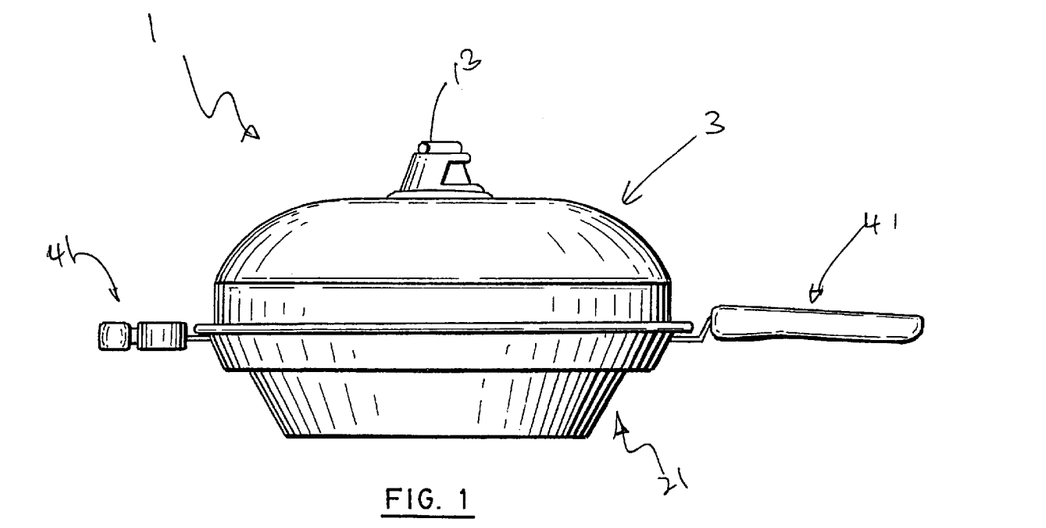
FIG. 1 is a side view of the cooker according to a preferred embodiment of the present invention.

As shown in FIG. 1, the cooker 1 according to the present invention comprises a cooking vessel 21, a cover 3 and preferably a rack 51. In the context of the present invention, the cooking vessel can be any base unit usable for cooking food and usable in combination with the cover according to the present invention.

Figure 2:
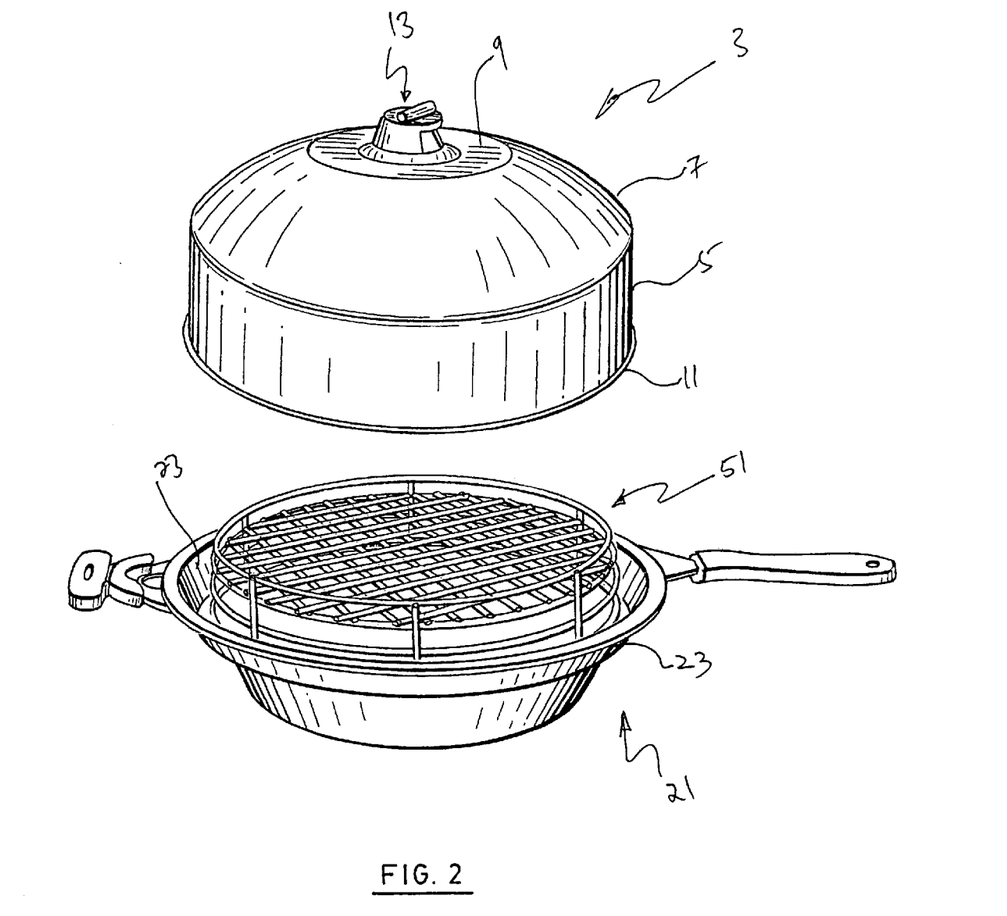
FIG. 2 is a partially exploded side perspective view of the cooking vessel of FIG. 1.

In the illustrated embodiment, the cooking vessel 21 comprises an open receptacle having a bottom surface 31 which extends upwardly and unitarily to terminate at a circular rim. The circular rim has a diameter and an end extending upwardly so to form an annular collar 23. The annular collar 23 has a diameter larger than the diameter of the rim. The annular collar 23 is designed to protrude from the rim of the cooking vessels thereby creating an enhanced temporary vapour seal and allowing the moisture to roll back down in the cooking vessel 21 when the cover 3 is in place. The annular collar 23 is also designed to create a containment area thereby preventing splattering during the cooking process.

The cooking vessel 21 of the present invention preferably has a non-stick-coating interior and may be made of a suitable material such as a metal or metal alloy selected from the group consisting of carbon core stainless steel, aluminum core stainless steel, solid stainless steel with braised heat conducting base, carbon steel, copper aluminum clad stainless steel and cast iron. Preferably, it is made of a high-grade heat conducting aluminum.

Figure 4:
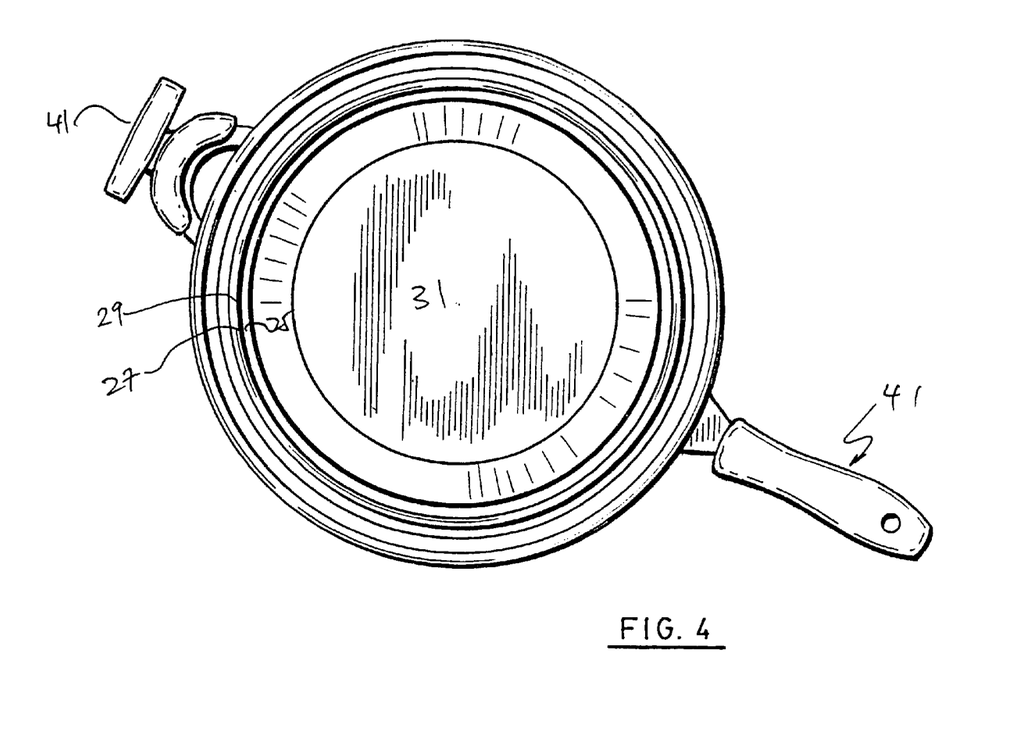
FIG. 4 is a top plan view of a cooking vessel according lo a preferred embodiment of the present invention.

Referring to FIGS. 2 and 4, the cooking vessel of the present invention may further comprise a pair of handles 41 located diametrically opposite from each other. The handles 41 are made of a heat resistant material such as a plastic or phenolic material or other material such as metal. The handles may further be different in shape and size and may be secured to the cooking vessel 21 with any appropriate attaching means such as industrial grade rivets or welded studs. In another preferred embodiment, the handles may form an integral part of the cooking vessel 21 such as integrated cast handles.

Figure 3:
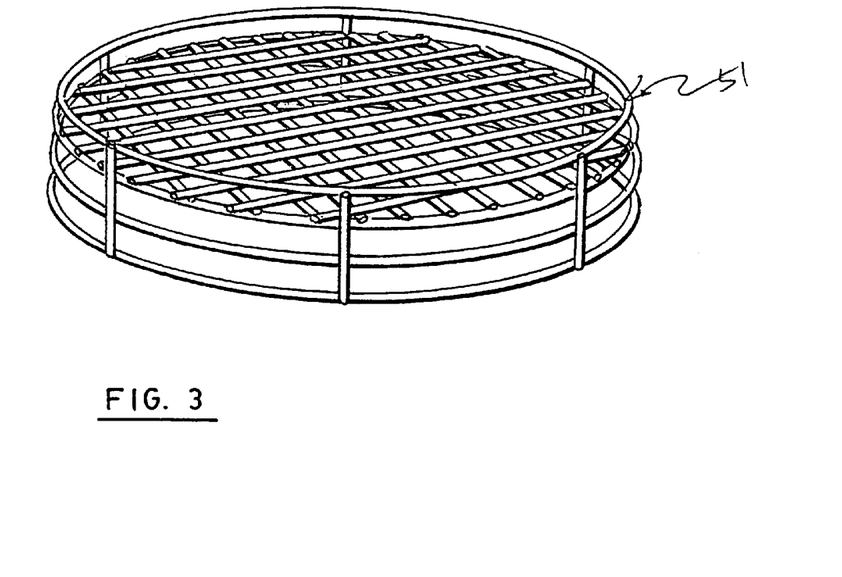
FIG. 3 is a perspective view of a rack according to a preferred embodiment of the present invention.

As can be further seen in FIGS. 2 and 3, the cooker 1 of the present invention may further comprise a steaming rack 51. The rack 51 has a shape that matches with the contour of the rim of the cooking vessel 21 in order to fit perfectly on the inner side of the rim 25. The rack 51 is designed to efficiently suspend food in the middle of the cooking vessel thereby allowing the food thereon to cook or keep warm.

Figure 5:
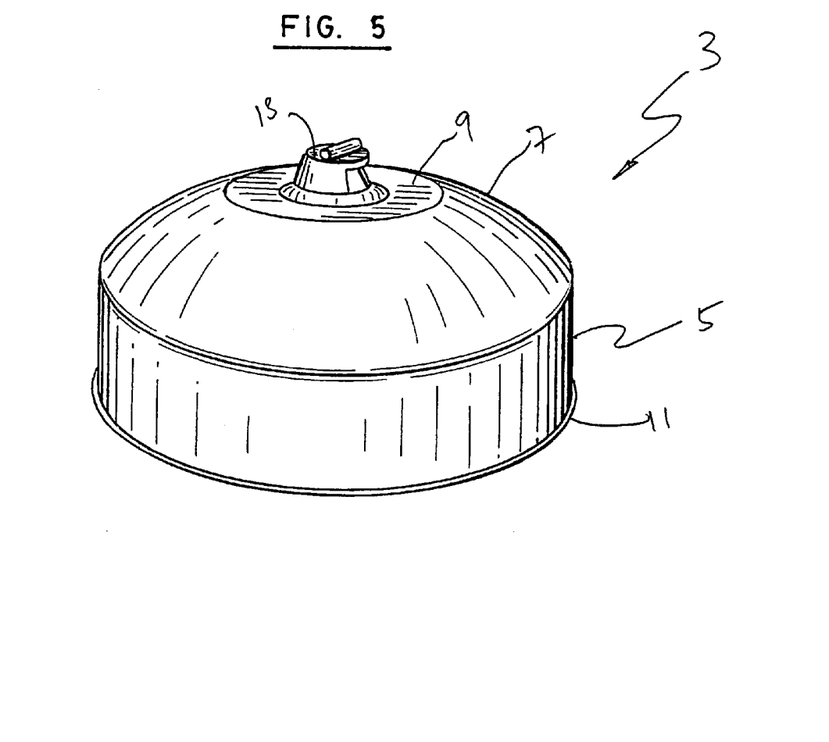
FIG. 5 is a perspective view of a cover according to a preferred embodiment of the present invention.

Referring now to FIG. 5, the cover 3 of the cooker of the present invention has a top and a bottom end. The bottom end has a circular edge adapted to sit on the outer side of the rim of the cooking vessel 21. The circular edge has a diameter smaller than the diameter of the annular collar 23. The cover 3 is characterized in that the circular edge extends straight and upwardly from the edge to form an annular wall 5 of a predetermined height. The annular wall 5 further extends inwardly to form a top end 7. As seen in the illustrated embodiment, the top end 7 of the cover may further include a handle 13. As shown in the illustrated embodiment, the handle 13 may incorporate a pressure regulator.

The cover 3 is made of a material suitable for its cooking applications and may be selected from the group consisting of metal such as stainless steel, carbon steel, aluminum or glass or heat resistant plastic.

The cover 3 is engineered to trap and use the hot steam generated by the cooking vessel 21 to cook food in the cooker 1. The inner surface of the cover is preferably shinny. This allows the surface to eventually reflect heat and to direct steam back down in the cooking vessel 21.

It should be noted that the annular wall 5 of the cover renders it unique in that it is this feature that allows efficient convection cooking. The high walls of the cover before the curve 7 at the top allow steam build up thus creating a separate containment area of steam. The curve portion 7 of the cover 3 allows conventional movement of the steam. It allows the steam to move up and down the entire volume of the cooker 1. Thus, the particular shape of the cover 3 allows the cooker 1 of the present invention to capture and contain the required volume of steam within the confinement. As a result, food is cooked by the hot steam generated in the cooker 1 and allows the food to retain its moisture. The effective steam trapping system of the cooker 1 of the present invention not only shortens the cooking time but also allows the food to retain its nutritional value.

As can be still seen in FIG. 5, the top end of the cover may comprise a flattened portion 9.

The cover 3 according to the present invention may be used separately from its base, that is with other cooking vessels 21 comprising but not limited to cookware, fry pans, stir fry pans, skillets woks, roasters, BBQ, grills and pots. It may also be adapted to work atop or in combination with other cooking methods and vessels to which where a cover is used on or can be used to enhance the cooking characteristics, function and usage of said potential usage, for example but not limited to stove top cooking, oven, grill, BBQ or microwave cooking as well as with all electrical, gas or non electrical or gas applications.

Food cooked in the cooker 1 of the present invention not only has a nutritional value higher than comparable to food that is boiled or otherwise cooked, since it retains most of the nutrients and vitamins contained in raw food and also has a good textural and sensorial value, which is comparable to fried food.

Figure 6:
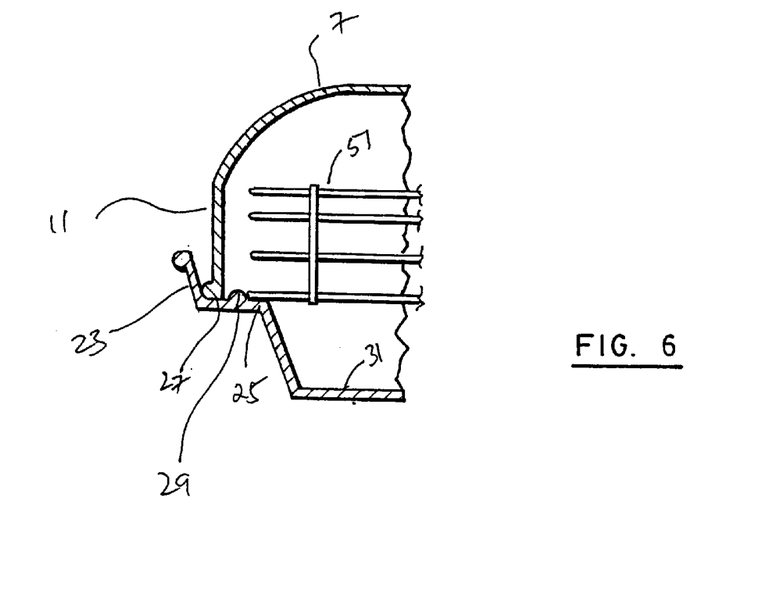
FIG. 6 is a cross sectional view of the cooker of FIG. 1

Turning now to FIG. 6, it can be seen that the rim of the cooking vessel 21 may be separated by an annular flange 23 extending along the entire circumference of the cooking vessel 1, thereby defining an inner and outer sides of the rim 25, 27. The inner end is adapted to receive a corresponding edge of the rack 51. The outer end of the rim 27 is adapted to receive the circular edge of the cover 3.

TEST OF TURBO COOKER™ PAN VERSUS STANDARD COOKWARE:

A.) THE PURPOSE OF THE TEST

A comparative study on the cooker of the present invention (referred to as Turbo Cooker™) was carried out in order to show its superiority compared to standard cookwares.

The purpose of this test is to measure the effectiveness of The Turbo Cooker™ pan designed with the unique straight sided domed cover, compared to other, usual types of stove top cooking apparatus. All stovetop cooking procedures use essentially the same kinds of equipment: a base pan with a cover. Variations are the size of the pan, cooking area and the shape and depth of the cover.

B.) EQUIPMENT

1.) Cookware;
   (a) The Turbo Cooker™
      10¼" wide at top of pan, 8½" at base/2¼" deep/2 step ledge
      straight sided domed cover/11½ wide/2½" 1$^{st}$ step/4½ high
   (b) Wearever™ skillet
      11½ pan/3¼ deep/⅛" thick/no edge
      glass cover with a slight concave
      Turbo cover sits affixed right on top of the width of the skillet
   (c) Nordicware™ stir fry
      12" wide at top of pan, 6"
      wide at base/4¼" deep/no edge
      no cover (used Pantastic™ cover which rests into top of the pan)
      Turbo cover rests into the top of the pan
   (d) Nordicware™ roaster
      12" wide/4" deep/ribbed base/1 step ledge
      2 step high dome cover, 12" wide/6" high
   (e) Pantastic™ wok
      12" at the top/6¼ at base (cylindrical)/4⅜" deep/2¼" ledge
      aluminum cover, slight concave/11¾" wide/4½" high
      Turbo cover fits into trough of the Pantastic™ base
   (f) 12" fry pan
      Standard aluminum core, Teflon coated 12" fry pan
      using Nordicware™ roaster & Turbo Cooker™ pan cover.

2.) Heat Source: The cooking tests were done on a standard, electrical, household stove with 4 Calrod element burners, using the larger burners.

3.) The configuration of covers used on each piece of cookware:
   (a) (i) The Turbo Cooker™ pan with unique straight sided domed cover.
      (ii) The Turbo Cooker™ pan with the Nordicware™ roaster dome cover.
      (An adapter ring needed to be used as the cover is slightly larger than the pan)
      (iii) The Turbo Cooker™ pan using the Pantastic™ cover.
      (iv) The Turbo Cooker™ pan using the Flat stainless steel universal lid.
   (b) (i) Wearever™ skillet, non-stick coated, stamped aluminum with regular glass cover.
      (ii) Wearever™ skillet, using a Turbo Cooker™ pan unique straight-sided domed cover.

(iii) Wearever™ skillet, using a Turbo Cooker™ cover but on top of an adapter ring.

(An adapter ring was used to verify the results apposed to without the ring to compare results with the Nordicware™ roaster cover on the same skillet).

(iv) Wearever™ skillet, using the Pantastic™ cover.

(v) Wearever™ skillet, using the Nordicware™ roaster cover but on top of an adapter ring.

(An adapter ring needed to be used as the cover is slightly larger than the pan)

(c) (i) Nordicware™ stir-fry, non-stick coated, stamped steel using Flat stainless steel universal lid.

(ii) Nordicware™ stir-fry, using a Turbo Cooker™ pan unique straight-sided domed cover.

(iii) Nordicware™ stir-fry, using the Nordicware™ roaster domed cover (iv) Nordicware™ stir-fry, using the Pantastic™ cover, (d) (i) Nordicware™ roaster, non-stick coated, stamped steel with its high domed cover.

(ii) Nordicware™ roaster, using a Turbo Cooker™ cover but on top of an adapter ring.

(An adapter ring needed to be used as the cover is slightly larger than the pan)

(e) (i) Pantastic™ wok, non-stick coated, stamped steel with a domed cover.

(ii) Pantastic™ wok, using a Turbo Cooker™ pan unique straight sided domed cover.

(iii) Pantastic™ wok, using a flat aluminum cover.

(f) (i) 12" fry pan * with Turbo Cooker™ pan straight sided domed cover sitting in the pan.

(ii) 12" fry pan * using the Nordicware™ roaster cover (closest to the Turbo Cooker™ pan)

The aluminum flat cover is from an aluminum pot. The cover fits the surface of each pan.

The adapter ring is a sheet of round aluminum (pizza pan) that had a hole cut out to allow the steam to function as it would normally if the cover in question sat properly on the ledge of the pan. In such the adapter replaced and became a ledge.

C.) METHOD

Frozen meat which has been in the freezer for at least 48 hours (frozen in separated zip lock™ bags) has been defrosted and then weighed to insure similar results will manifest in each test.

The meat is placed into a Turbo Cooker™ pan and spread forming one large patty. The same meat size & thickness was used for each different piece of cookware. A timer with auto reset is used for exact timing.

Stage 1) From a cold pan, placed on a cold element the pan (with the meat in it) is heated to maximum.

Stage 2) After 2 minutes, the timer (which has been set for 2 minutes) rings. The cover is removed and the timer is allowed to continue to ring. The meat is flipped, and then chopped up for 28 seconds and at 30 seconds the cover is replaced and the timer is stopped and then restarted for an additional 2 minutes.

Stage 3) When the timer rings again, the meat is stirred, flipped and chopped up again for 23 seconds. A pre-pared ¼ cup of water is added and stirred for 5 seconds, totaling an elapsed time of 28 seconds. The cover is then replaced and the timer is stopped. It has rung for 30 seconds (after it originally counted down the 2 minutes). An additional timer, which is already set for 1 minute, is started.

Stage 4) When the 1-minute has elapsed and the timer rings the cover is removed. The pre-prepared 1-cup of onions is added (being held in the right hand of the tester) and the can of tomatoes (which has already been opened) is added next (which has been held in the left hand). Then the pasta is added (being held in the right hand of the tester) and a pre-prepared 1-cup of water is added (which has been held in the left hand). The mixture is then stirred for a total elapsed time of 58 seconds.

The cover is replaced for a total lapsed time of 1 minute. The scale is then turned off.

Stage 5) The heat is turned to medium high (#8 on the dial) and then a third timer, which has been preset for 12 minutes, is started.

During the 12 minutes the measuring tray is cleaned.

Stage 6) The food is then tested for texture and taste.

The element is then allowed to cool (for the next test) and the scale is washed and cleaned so that it also is ready for the next test.

| Ingredients used for the test: | Ingredients used for testing Pantastic™ wok: |
|---|---|
| 454 gr. medium ground beef | 227 gr. Medium ground beef |
| 128 gr. (1 cup) of minced onions | 64 gr. (½ cup) of minced onions |
| 796 ml. (28 oz.) can of diced tomatoes | 398 ml. (14 oz.) can of diced tomatoes |
| 200 gr. (2½ cups) of Penne | 100 gr. (1¼ cups) of Penne |
| 1 cup room temperature water | 1 cup room temperature water |

Explanation as to why this recipe was used as the test and the control elements for testing purposes:

This recipe was made for cookware that prepare all in one meals, meaning a pot or pan that can prepare several different foods or ingredients combining them into one full meal.

This recipe allows for 3 very specific results to be charted.

(1) That 3 types of different ingredients can be cooked in one pot or pan and we can study the tastes and textures of these different foods and verify for consistency. (Meat, vegetables and pasta).

(2) That we can verify the overall cooking efficiency of the cookware (and its components, as well by interchanging the covers we can control the tests integrity as to the actual improvements or decreases in cooking results).

(3) We can verify how heat and steam are used and transferred in each piece of cookware as well as how the different covers play a role in overall cooking results. This is analyzed by how evenly the food is cooked—for instance the pasta should be cooked to the same degree and texture throughout the pan and that the taste of the meal should be consistent throughout (for each and every piece of cookware being tested). This final test determines (along with the efficiency aspect) the true usage and benefits to each piece of cookware as well as the relationship and results from the cover used.

Each piece of cookware used, was tested with several forms of covers (including the Turbo Cooker™ pan's) to allow the cookware to perform in a similar manner to the Turbo Cooker™ pan. As well the design of the straight-sided domed cover is tested to see if it actually improves cooking performance and results, which are similar to those results recorded for the Turbo Cooker™ pan itself.

We used a smaller quantity of ingredients for the test of the Pantastic™ wok (prior art U.S. Pat. No. 5,511,466)

because of the limited capacity of this unit. We used exactly ½ the quantity of all ingredients except the water, this due to initial tests which saw a completely burnt pasta result.

D.) Summary of Results:

Objective Desired: To test the performance of:
1.) A selection of standard cookware with various covers
2.) A selection of standard cookware with the Turbo Cooker™ pan's unique straight sided domed cover.
3.) To measure the differences between (1.) & (2.).
4.) Compare results of (3.) above to performance of The Turbo Cooker™ pan.

General Observations: With a wide selection of covers and bases and testing each cover on each base we are able to see that a straight sided domed cover has certain benefits to all other forms of domed covers even a high dome cover. Due to the various base sizes an adapter ring was created to enable that smaller covers to fit on larger surfaces and the larger cover to fit onto small bases. The control in this process is that we tested the Turbo Cooker™ cover on one piece of cookware both with and without the adapter ring to see if the ring itself affected the results, see test 3 (b) (ii) and (b) (iii).

The skillet, roaster and fry pan have almost the same width as the Turbo Cooker™ pan at the top where the cover sits but are all much larger at the base (thus a greater cooking surface). A flat cover blows steam & heat out the sides. A domed cover retains more heat and moisture and therefore improves the overall performance over a flat cover and it appears that the straight-sided dome cover improves the results of both a flat and a standard dome cover.

The stir fry has a smaller cooking surface and the results with standard dome cover were better than a flat cover and even greater with the Turbo Cooker™ pan's straight sided dome cover. An improvement is seen when the base unit is thicker than thinner, as evident in the greater results of Test 6 over the same combination in test 4.

Special Note: It should be noted that to see the efficiency of the covers as far as rotation of heat and steam, we did not stir the food during the cooking stages. Only at specified stages did we stir food. This may be why in certain cases there was an inconstant taste as typically food needs to be stirred during cooking. The more proficient the cooking system the more overall taste and blending of tastes that will occur. By, seeing the results of testing a cooking process without stirring food, we see if the unit itself is capable of mixing flavors, which normally would be enhanced by actually stirring the ingredients together.

We used a flat cover for the first test (of the Turbo Cooker™) to verify 1 set of results with all forms of covers. The stir fry pan had no cover itself. We used the flat glass cover of the skillet as that was the cover that came with the pan. From the verification of a flat cover versus all forms of domed covers that we had, we did not do tests for every piece of cookware with a flat cover, simply as a flat cover is the least efficient form of cover and our focus was on how domed covers of different shapes function against each other. The flat cover serves as a control.

Each pan tested always saw the first set of results being with its original cover, subsequent tests were recorded by best results obtained.

E.) The Test, results and observations:

Test of #1—The Turbo Cooker™ Pan

The standard cooking procedure was followed using The Turbo Cooker™ pan, with 4 different covers, which were;

(a) (i) The Turbo Cooker™ pan with unique straight sided domed cover.

(a) (ii) The Turbo Cooker pan with the Nordicware™ roaster dome cover.
(An adapter ring needed to be used as the cover is slightly larger than the pan)

(a) (iii) The Turbo Cooker™ pan using the Pantastic™ cover.

(a) (iv) The Turbo Cooker™ pan using the Flat stainless steel universal lid.

Observations: (a.) (i) Meat is moist and has a fully seasoned taste, the overall flavor was uniform throughout & the pasta had ideal tenderness.

Observations: (a.) (ii) The overall taste was good, pasta a little a la dente. About ¼ of the base was burnt.

Observations: (a.) (iii) Meat had a good taste but was not very moist. The overall taste was good, pasta was good but a little a la dente. About ¼ of the base was burnt.

Observations: (a.) (iv) The first look is okay, but the pasta absorbed less of the liquid and tomato=less taste. The pasta on the top was less cooked, almost raw and overall there was too much liquid. The pasta tasted as if it was simply boiled, very little taste of the meal. The base of the pan had a small amount of burnt areas.

Test of #2—The Wearever™ Skillet

The standard cooking procedure was followed using The Wearever™ Skillet, with 5 different covers, which were;

(b) (i) Wearever™ skillet, non-stick coated, stamped aluminum with regular glass cover.

(b) (ii) Wearever™ skillet, using a Turbo Cooker™ pan unique straight sided domed cover.

(b) (iii) Wearever™ skillet, using a Turbo Cooker™ cover but on top of an adapter ring.
(An adapter ring was used to verify the results apposed to without the ring to compare results with the Nordicware™ roaster cover on the same skillet).

(b) (iv) Wearever™ skillet, using the Pantastic™ cover.

(b) (v) Wearever™ skillet, using the Nordicware™ roaster cover but on top of an adapter ring.
(An adapter ring needed to be used as the cover is slightly larger than the pan)

Observations: (b.) (i) There was evidence in the middle of the pan that burning of the meat had occurred. As well, the sauce was lacking in liquid.

Observations: (b.) (ii) The overall flavor was acceptable. There was sufficient liquid in the sauce & the meat was browned but not burnt.

Observations: (b.) (iii) Flavor was acceptable, there was a little burning. Meat and overall results moist.

Observations: (b.) (iv) The pasta was unevenly cooked, the sauce was just on the border line of running out, and there was a small amount of burning on the base of the pan.

Observations: (b.) (v) The pasta was a little more than a la dente and there was some burnt areas.

Test of #3—The Nordicware™ Stir Fry Pan

The standard cooking procedure was followed using a Nordicware™ stir-fry, with 4 different covers, which were;

(c) (i) Nordicware™ stir-fry, non-stick coated, stamped steel using Flat stainless steel universal lid.

(c) (ii) Nordicware™ stir-fry, using a Turbo Cooker™ pan unique straight-sided domed cover.

(c) (iii) Nordicware™ stir-fry, using the Nordicware™ roaster domed cover (c) (iv) Nordicware™ stir-fry, using the Pantastic™ cover.

Special observation: The stir-fry base is smaller than the element of the stove therefore, 100% of the base is provided heat, as well as the immediate sides of the pan (which slop upwards to the top).

Observations: (c.) (i) Pasta was a little a la dente, the overall taste was inconstant.

Observations: (c.) (ii) The overall flavor was acceptable. The pasta was well cooked & had an improved taste to the above. Meat was fine.

Observations: (c.) (iii) There was some burning, the taste was inconsistent and pasta could have used more cooking.

Observations: (c.) (iv) The overall taste was inconsistent, The meat had a better taste than the pasta which was not fully cooked.

Test of #4—The Nordicware™ Roaster

The standard cooking procedure was followed using a Nordicware™ roaster, with 2 different covers, which were;

(d) (i) Nordicware™ roaster, non-stick coated, stamped steel with its high domed cover.

(d) (ii) Nordicware™ roaster, using a Turbo Cooker™ cover but on top of an adapter ring.

(An adapter ring needed to be used as the cover is slightly larger than the pan)

Special observation: We needed to create a adapter to hold the slightly small Turbo Cooker™ straight domed cover on top of the roaster.

Observations: (d.) (i.) Possibly due to the thinner material in the pan, there was significant burning. The pasta was poorly cooked, i.e., it had several different textures through out the pan. The meat was significantly burnt & the pan splattered fat during the 1$^{st}$ four stages.

Observations: (d.) (ii) Taste was good, there was a little burning and the pasta was not consistently cooked, but better than (d) (i). There was burning as well.

Test of #5—The Pantastic™ Wok:

Similar cooking procedures were used, except lower temperatures for the first two stages (which was medium high or #8 on the temperature control knob) and then medium for the balance of the cooking (which was #7 on the temperature control knob) as well as half the quantity of ingredients were used, using a Pantastic™ wok, with 3 different covers, which were;

(e) (i) Pantastic™ wok, non-stick coated, stamped steel with a domed cover.

(e) (ii) Pantastic™ wok, using a Turbo Cooker™ pan unique straight sided domed cover.

(e) (iii) Pantastic™ wok, using a flat aluminum cover.

Observations: (e.) (i) The overall taste was very plain, the pasta was a la dente and overall the taste was somewhat bland.

Observations: (e.) (ii) The taste was okay, but still the pasta was a little bland. The meat was moister.

Observations: (e.) (iii) The meat was somewhat burnt, was dry and the over all taste was bland.

Test of #6—A Standard 12" Fry Pan:

The standard cooking procedure was followed using a standard 12" fry pan, with 2 different covers, which were;

(f) (i) 12" fry pan with Turbo Cooker™ pan straight sided domed cover sitting in the pan.

(f) (ii) 12" fry pan using the Nordicware™ roaster cover (closest to the Turbo Cooker™ pan)

Observations: (f.) (i) The pasta was overall a la dente with only a few being less than a la dente. The overall taste was okay but somewhat bland. The meat was moist.

Observations: (f.) (ii) A la dente. A little burnt & the pasta was a little uncooked in areas. The taste was even blander than (d) (ii). Meat was moist.

Overall conclusion: The performance of standard pans using the straight-sided domed cover of the Turbo Cover™ improved significantly.

The only cover that comes close to the results to the straight-sided domed Turbo Cooker™ domed cover is the Nordicware™ high domed cover.

All domed coves create a certain amount of convection cooking, simply due to the rolling effect of heat and steam as it passes up and around the domed interior of a cover. The advantage of the straight sided domed cover is that it allows the creation of a large volume of steam. The steam which would normally rotate thus creating convention cooking. In a straight sided domed cover this is enhanced because of the separation created by the straight walls The final conclusion is that the straight-sided domed cover out performs all other forms of domed covers by creating 2 separate functions, one of rotating steam "convention" cooking and the other of a vat of heat and steam retaining more moisture for the cooking process in the designated area provided by the straight sides of the cover.

Although the present invention has been explained hereinabove by way of a preferred embodiment thereof, it should be understood that the invention is not limited to this precise embodiment and that various changes and modifications may be effected therein without departing from the scope or spirit of the invention.

What is claimed is:

1. A cooker comprising a cooking vessel and a cover, the cooking vessel comprising an open receptacle having a bottom surface which extends upwardly and unitarily to terminate at a circular rim, the rim having a diameter and an end extending upwardly thereby forming an annular collar, the annular collar having a diameter larger than the diameter of the rim;

a cover having a top and a bottom end, the bottom end having a circular edge adapted to sit on the rim of the cooking vessel, the circular edge having a diameter smaller than the diameter of the annular collar, the cover extending straight and upwardly from the circular edge to form an annular wall of a predetermined height, the annular wall extending inwardly to form a top end, the top end including a handle.

2. A cooker according to claim 1, further comprising a rack designed to fit over and inside the cooking vessel.

3. A cooker according to claim 2, wherein the rim has an inner end and an outer end, the inner end being separated from the outer end by an annular flange, the inner end designed to receive the rack and the outer end designed to receive the edge of the cover.

4. A cooker according to claim 3, wherein the top end of the cover has a flattened portion.

5. A cooker according to claim 1, wherein the cooking vessel further comprises at least one handle connected thereon.

6. A cooker according to claim 1, wherein the cover is made of a material suitable to withstand exposure to heat and pressure.

7. A cooker according to claim 6, wherein the material is selected from the group consisting of metal, steel stainless steel, carbon steel and aluminum.

8. A cover for use in combination with a cooking vessel of the type comprising an open receptacle having a bottom surface which extends upwardly and unitarily to terminate at a circular rim, the rim having a diameter and an end extending upwardly thereby forming an annular collar, the annular collar having a diameter larger than the diameter of the rim, the cover comprising:

a top and a bottom end, the bottom end having a circular edge adapted to sit on the rim of the cooking vessel, the circular edge having a diameter smaller than the diameter of the annular collar, the cover extending straight and upwardly from the circular edge to form an annular wall of a predetermined height, the annular wall extending inwardly to form a top end, the top end including a handle.

9. A cover according to claim 7, wherein the top end of the cover has a flattened portion.

10. A cover according to claim 8, wherein the cover is made of a material suitable to withstand exposure to heat and pressure.

11. A cover according to claim 10, wherein the material is selected from the group consisting of metal, steel stainless steel, carbon steel, aluminum, glass and heat resistant plastic.

* * * * *